United States Patent
Ueno et al.

(10) Patent No.: US 9,952,022 B2
(45) Date of Patent: Apr. 24, 2018

(54) MODULARIZED ARMOR STRUCTURE WITH UNMANNED AERIAL VEHICLE LOADED AND ARMORED VEHICLE USING THE SAME

(71) Applicant: MITSUBISHI HEAVY INDUSTRIES, LTD., Tokyo (JP)

(72) Inventors: Yoshihiko Ueno, Tokyo (JP); Shojiro Furuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 262 days.

(21) Appl. No.: 14/668,020

(22) Filed: Mar. 25, 2015

(65) Prior Publication Data

US 2015/0276353 A1    Oct. 1, 2015

(30) Foreign Application Priority Data

Mar. 28, 2014  (JP) ................. 2014-070261

(51) Int. Cl.
*B64F 1/12* (2006.01)
*B64F 1/22* (2006.01)
(Continued)

(52) U.S. Cl.
CPC ............. *F41H 7/04* (2013.01); *B64C 39/022* (2013.01); *B64C 39/024* (2013.01);
(Continued)

(58) Field of Classification Search
CPC ..... B64F 1/222; B64C 39/024; B64C 39/022; B64C 2201/08; B64C 2201/208;
(Continued)

(56) References Cited

U.S. PATENT DOCUMENTS 3,149,803 A * 9/1964 Petrides et al. ....... B64C 39/022
244/17.13
7,149,611 B2 * 12/2006 Beck .................... B64C 39/022
244/171
(Continued)

FOREIGN PATENT DOCUMENTS

EP    2105696 A2 *  9/2009  ............... F41H 7/04
EP    2249118 A2 * 11/2010  ............. F41H 7/048
(Continued)

OTHER PUBLICATIONS

Notification of Reasons for Refusal dated Sep. 20, 2017 in corresponding Japanese Application No. 2014-070261 (with English translation).

*Primary Examiner* — Richard R Green
(74) *Attorney, Agent, or Firm* — Wenderoth, Lind & Ponack, L.L.P.

(57) ABSTRACT

An armored vehicle includes: a basic armored vehicle having a predetermined basic external armor; a modularized armor structure exchangeably attached to the basic external armor; and an unmanned aerial vehicle loaded on the modularized armor structure. The modularized armor structure includes: an unmanned aerial vehicle loading section configured to load the unmanned aerial vehicle; an armoring material structure formed of armoring material; and an attaching section used to exchangeably attach the modularized armor structure to the basic armored vehicle.

10 Claims, 10 Drawing Sheets

(51) Int. Cl.
*F41H 7/04* (2006.01)
*B64C 39/02* (2006.01)

(52) U.S. Cl.
CPC .... *B64C 2201/027* (2013.01); *B64C 2201/08* (2013.01); *B64C 2201/122* (2013.01); *B64C 2201/146* (2013.01); *B64C 2201/148* (2013.01); *B64C 2201/208* (2013.01); *B64F 1/12* (2013.01); *B64F 1/222* (2013.01)

(58) Field of Classification Search
CPC ... F41H 5/02; F41H 7/04; F41H 7/044; F41H 7/048
See application file for complete search history.

(56) References Cited

U.S. PATENT DOCUMENTS

| | | | |
|---|---|---|---|
| 8,205,820 B2 | 6/2012 | Goossen et al. | |
| 8,602,349 B2* | 12/2013 | Petrov | B64C 39/022 244/17.23 |
| 8,899,903 B1* | 12/2014 | Saad | B64C 39/024 320/109 |
| 8,991,294 B2* | 3/2015 | Shkatov | B32B 3/08 89/36.02 |
| 9,056,676 B1* | 6/2015 | Wang | B64F 1/222 |
| 2008/0017426 A1 | 1/2008 | Walters et al. | |
| 2009/0314883 A1 | 12/2009 | Arlton et al. | |
| 2011/0079133 A1 | 4/2011 | Shkatov et al. | |
| 2011/0168838 A1* | 7/2011 | Hornback | B64C 39/028 244/63 |
| 2013/0081245 A1 | 4/2013 | Vavrina et al. | |
| 2015/0191259 A1* | 7/2015 | Giovannini | B64C 39/024 701/3 |
| 2016/0304217 A1* | 10/2016 | Fisher | B64C 39/024 |

FOREIGN PATENT DOCUMENTS

| | | | | |
|---|---|---|---|---|
| EP | 2256453 A2 * | 12/2010 | | F41H 7/04 |
| EP | 2899128 B1 * | 11/2016 | | B64C 39/024 |
| JP | 02-034400 | 3/1990 | | |
| JP | 04-306198 | 10/1992 | | |
| JP | 2003-294393 | 10/2003 | | |
| JP | 2010-179914 | 8/2010 | | |
| JP | 2011-46364 | 3/2011 | | |
| JP | 2013-203394 | 10/2013 | | |
| WO | WO 2007141795 A1 * | 12/2007 | | B64C 39/022 |
| WO | 2013/150442 | 10/2013 | | |

* cited by examiner

MODULARIZED ARMOR STRUCTURE WITH UNMANNED AERIAL VEHICLE LOADED AND ARMORED VEHICLE USING THE SAME

CROSS-REFERENCE

This application claims a priority on convention based on Japanese Patent Application No. JP 2014-070261 filed on Mar. 28, 2014. The disclosure thereof is incorporated herein by reference.

TECHNICAL FIELD

The present invention relates to a modularized armor structure with an unmanned aerial vehicle loaded and an armored vehicle using the same.

BACKGROUND ART

JP 2013-203394A (Patent Literature 1) discloses a technique related to a base station for an unmanned aerial vehicle (UAV). The base station carries out the supply of electric power or fuel to the unmanned aerial vehicle, and the transmission and reception of data and commands.

JP 2003-294393A (Patent Literature 2) discloses an armored vehicle having a detachable type armored material.

JP 2011-046364A (Patent Literature 3) discloses a car mounted apparatus for carriage which loads and unloads an unmanned helicopter in a stable attitude.

CITATION LIST

[Patent Literature 1] JP 2013-203394A
[Patent Literature 2] JP 2003-294393A
[Patent Literature 3] JP 2011-046364A

SUMMARY OF THE INVENTION

Conventionally, when an unmanned aerial vehicle is loaded on an armored vehicle, a large-scaled modification of the armored vehicle is required, and the time and cost for the modification have increased.

Also, conventionally, an operable time of the unmanned aerial vehicle after separating from the armored vehicle was limited.

An object of the present invention provides a modularized armor structure with an unmanned aerial vehicle loaded, which does not need a large-scaled modification of the armored vehicle, and an armored vehicle having the modularized armor structure.

In an aspect of the present invention, a modularized armor structure includes: an unmanned aerial vehicle loading section configured to load an unmanned aerial vehicle; an armoring material structure formed of armoring material; and an attaching section used to exchangeably attach the modularized armor structure to a predetermined basic external armor of an armored vehicle.

Also, another aspect of the present invention, an armored vehicle includes: a basic armored vehicle having a predetermined basic external armor; a modularized armor structure exchangeably attached to the basic external armor; and an unmanned aerial vehicle loaded on the modularized armor structure. In this case, the modularized armor structure includes: an unmanned aerial vehicle loading section configured to load the unmanned aerial vehicle; an armoring material structure formed of armoring material; and an attaching section used to exchangeably attach the modularized armor structure to the basic armored vehicle.

In the above, desirably, the modularized armor structure further includes a first connector electrically connected with the armored vehicle; and a second connector electrically connected with the unmanned aerial vehicle. The unmanned aerial vehicle comprises a power source, and electric power is supplied from the armored vehicle to the power source of the unmanned aerial vehicle through the first and second connectors.

Also, the unmanned aerial vehicle includes a radio communication section. Desirably, the modularized armor structure further includes a radio communication section configured to carry out a radio communication with the radio communication section of the unmanned aerial vehicle to allow exchange of a control signal and data between the armored vehicle and the unmanned aerial vehicle.

Also, the modularized armor structure further includes: a winding unit configured to wind a cable connected with the first and second connectors to allow exchange of a control signal and data between the armored vehicle and the unmanned aerial vehicle. The second connector may be separated from the modularized armor structure in a flight of the unmanned aerial vehicle in a connection state with the unmanned aerial vehicle.

Also, the modularized armor structure further includes: a locking/unlocking mechanism disposed in the unmanned aerial vehicle loading section to lock the unmanned aerial vehicle in response to a lock command supplied from the armored vehicle and to unlock the unmanned aerial vehicle in response to a unlock command supplied from the armored vehicle.

In this case, the locking/unlocking mechanism may be of an electromagnetic type or a mechanical type.

Also, the armoring material structure formed of armoring material having a performance withstanding an attack using ammunitions which includes a bullet, a cannonball, a guided missile, an armor piercing ammunition, armor-piercing composite rigid, or an armor-piercing fin stabilized discarding sabot.

According to the present invention, in case of loading an unmanned aerial vehicle on an armored vehicle, a modification of the armored vehicle can be facilitated. Also, an operable time of the unmanned aerial vehicle can be extended.

DESCRIPTION OF EMBODIMENTS

Hereinafter, a modularized armor structure having an unmanned aerial vehicle loaded and an armored vehicle having the modularized armor structure will be described with reference to the attached drawings.

Figure 1:
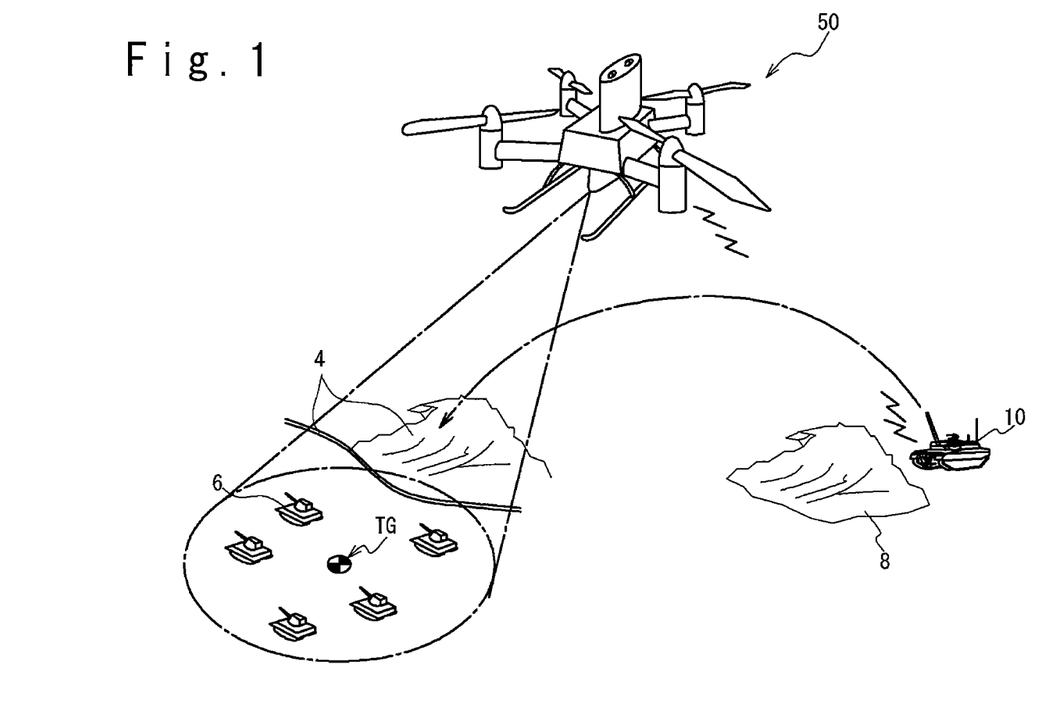
FIG. 1 is a birds-eye view showing an operation of an armored vehicle and an unmanned aerial vehicle.

Operation of Unmanned Aerial Vehicle and Armored Vehicle Having the Modularized Armor Structure With reference to FIG. 1, the operation of an armored vehicle 10 with the modularized armor structure and the unmanned aerial vehicle or a drone 50 will be described. FIG. 1 is a birds-eye view showing a use condition of the unmanned aerial vehicle 50 controlled under a remote control. In detail, the unmanned aerial vehicle 50 is separated and takes off from an unmanned aerial vehicle loading section of the modularized armor structure attached to the armored vehicle 10 which is located in a position behind a sight blocking object 8. The unmanned aerial vehicle 50 flies out into air, carries out reconnaissance or observation of landform 4 and targets 6 from the air over the sight blocking object 8, and sometimes align the sight to the target to attack it. For example, the unmanned aerial vehicle 50 images the attack targets 6 from the air to measure the position of a target TG. In FIG. 1, a helicopter of a 4-rotor type is exemplified. However, in addition to the helicopter of a 2-rotor type or a 1-rotor type, a fixed-wing craft can be used as the unmanned aerial vehicle 50.

The armored vehicle 10 is such as a tank and an armored car. The armored vehicle 10 runs in the condition that the unmanned aerial vehicle 50 is loaded, and outputs commands to control the unmanned aerial vehicle 50 to be separated from the unmanned aerial vehicle loading section and to fly into air. Also, the armored vehicle 10 can acquire the measurement results such as the altitude and position of the unmanned aerial vehicle 50, imaging data obtained through an imaging operation, and measurement data, and status data showing a result of a self-diagnostic function of the unmanned aerial vehicle 50.

The sight blocking object 8 is a landform, a concealment structure, and an obstacle that the armored vehicle 10 uses to hide. When the armored vehicle 10 should be concealed, a smoke screen and a camouflage network can be used.

Figure 2:
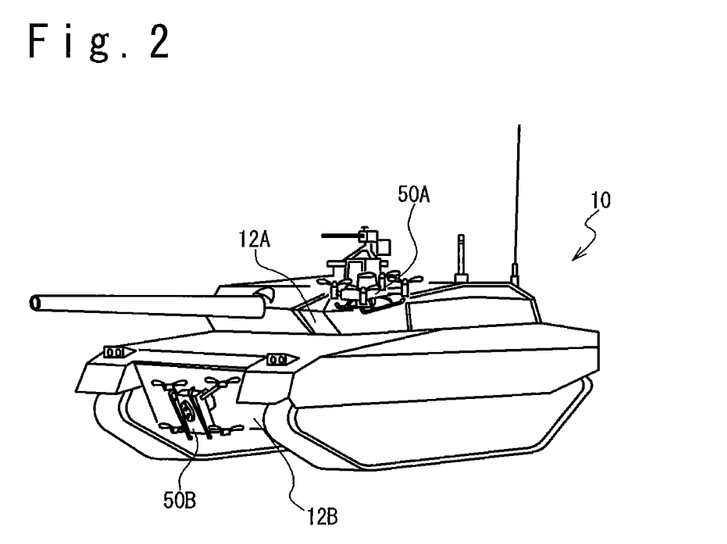
FIG. 2 is a perspective view showing an outward appearance of the armored vehicle having a modularized armor structure.

Outward Appearance Configuration of Armored Vehicle Having Modularized Armor Structure with Unmanned Aerial Vehicle Loading Section FIG. 2 shows a perspective view showing an outward appearance of the armored vehicle 10. In an embodiment in FIG. 2, modularized armor structures 12 (12A and 12B) are attached to the armored vehicle 10. In this embodiment, although the two modularized armor structures 12 may be attached to the armored vehicle 10, either one may be attached. Each of the modularized armor structures 12 has an unmanned aerial vehicle loading section, on which an unmanned aerial vehicle 50 (50A or 50B) is loaded. The unmanned aerial vehicle 50 is detachably loaded on the unmanned aerial vehicle loading section in addition to a cannon and an inspection sight apparatus.

Generally, because the unmanned aerial vehicle 50 is not a standard equipment of the armored vehicle 10, the armored vehicle 10 loaded with the unmanned aerial vehicle 50 becomes special. However, when the whole armored vehicle 10 is based on a special specification, it has become not possible to easily carry out a specification change according to an action to be performed. Therefore, when there is a request to the armored vehicle 10 to load the unmanned aerial vehicle 50, the unmanned aerial vehicle 50 can be loaded on the armored vehicle 10 without a large-scale modification, by using the modularized armor structure 12.

In the embodiment shown in FIG. 2, an unmanned aerial vehicle loading section 14 is disposed to load the unmanned aerial vehicle 50 on the exchangeable type modularized armor structure 12 adopted in the armored vehicle 10. The modularized armor structure 12 has a structure formed of an armoring material which has a performance enduring an attack using the ammunition such as bullets, cannonballs, guided missiles, armor piercing shot and shells, hard center armor-piercing shots and shells or armor piercing fin stabilized discharge sabot.

For example, materials such as steel sheet, ceramics composite material are used as the armoring material. The modularized armor structure 12 may be exchanged according to a kind of ammunition every time of the attack. Therefore, by disposing the unmanned aerial vehicle loading section 14 in the modularized armor structure 12, the specification change of the armored vehicle 10 can be easily and cheaply carried out according to an action requested to the armored vehicle 10, including whether or not the unmanned aerial vehicle 50 should be loaded.

Referring to FIG. 2, when the unmanned aerial vehicle 50 loaded on the modularized armor structure 12A which is attached to a gun turret side section of the armored vehicle 10 is used, the unmanned aerial vehicle 50 in the lock condition is unlocked from the unmanned aerial vehicle loading section 14 of the modularized armor structure 12A. After that, the unmanned aerial vehicle 50 starts a flight in response to a flight command transmitted from the armored vehicle 10 to the unmanned aerial vehicle 50 through the modularized armor vehicle 12A.

In order to separate the unmanned aerial vehicle 50 from the modularized armor structure 12B disposed in the front underside section of the armored vehicle 10 shown in FIG. 2, the unmanned aerial vehicle 50 in the lock state is unlocked from the unmanned aerial vehicle loading section 14 of the modularized armor structure 12B so that the unmanned aerial vehicle 50 falls on the ground. Then, after the armored vehicle 10 goes astern to open the sky above the unmanned aerial vehicle 50, so that the unmanned aerial vehicle 50 is set to a ready state possible to take off. Then, when the flight command is transmitted from the armored vehicle 10 to the unmanned aerial vehicle 50 through the modularized armor structure, the unmanned aerial vehicle 50 starts the flight in response to the flight command.

Configuration Example of Signal Processing System of Unmanned Aerial Vehicle 50

Next, a configuration example of the signal processing system of the unmanned aerial vehicle 50 will be described with FIG. 3. Note that the configuration of the unmanned aerial vehicle 50 is not limited to the configuration shown in FIG. 3.

Figure 3:
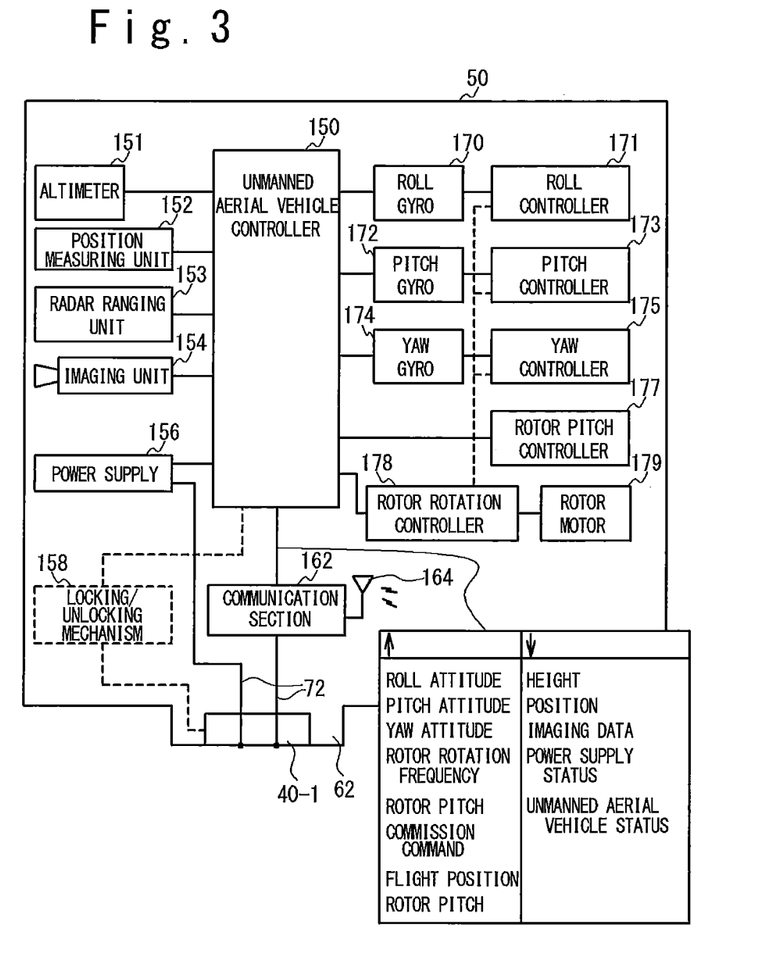
FIG. 3 is a diagram showing a configuration example of a signal processing system of the unmanned aerial vehicle.

The unmanned aerial vehicle 50 shown in FIG. 3 includes an unmanned aerial vehicle controller 150, an altimeter 151, a position measuring unit 152, a radar ranging unit 153, an imaging unit 154, a power supply 156, a locking/unlocking mechanism 158, a communication section 162, and an antenna 164. Also, the unmanned aerial vehicle 50 includes a roll gyro 170, a roll controller 171, a pitch gyro 172, a pitch controller 173, a yaw gyro 174, a yaw controller 175, a rotor pitch controller 177, a rotor rotation controller 178, and a rotor motor 179. Also, the unmanned aerial vehicle loading section 14 of the unmanned aerial vehicle 50 includes an engaging section 62 on the unmanned aerial vehicle, a contact 70 and a cable 72.

The unmanned aerial vehicle controller 150 carries out the control of the whole unmanned aerial vehicle 50 such as a control of flight of the unmanned aerial vehicle 50 and the attitude in the flight, and a transfer of observation data, a management of the power supply, and a communication control.

The altimeter 151 measures a flight altitude of the unmanned aerial vehicle 50.

The position measuring unit 152 measures a position of the unmanned aerial vehicle 50, and can use signals from the ground and GPS (global positioning system).

The radar ranging unit 153 measures the position of the target TG and a distance to the target TG.

The imaging apparatus 154 images the target TG and the periphery of it.

The power supply 156 is used to drive the unmanned aerial vehicle controller 150, the rotor motor for the flight and so on. When charging the power supply 156, the power is supplied from the armored vehicle 10 through the contact 70 and the cable 72 that are arranged in the unmanned aerial vehicle loading section 14 in the unmanned aerial vehicle 50.

The locking/unlocking mechanism 158 is disposed in the unmanned aerial vehicle loading section 14 of the unmanned aerial vehicle 50 to lock and unlock the unmanned aerial vehicle 50 to and from the modularized armor structure 12 attached to the armored vehicle 10. Note that locking/unlocking mechanism 158 may be disposed on the side of the armored vehicle 10 without disposing in the unmanned aerial vehicle 50.

The communication section 162 carries out communication with the armored vehicle 10 in wire or radio. In case of the wire communication, the communication is carried out through the cable 72 and the contact 70 which are disposed in the unmanned aerial vehicle loading section 14. In case of the radio communication, the communication is carried out through an antenna 164.

The roll gyro 170 detects an attitude change in a roll direction of the unmanned aerial vehicle 50. The roll controller 171 controls the attitude of the unmanned aerial vehicle 50 in the roll direction in response to a command from the unmanned aerial vehicle controller 150 and the detection result of the roll gyro 170.

The pitch gyro 172 detects an attitude change in the pitch direction of the unmanned aerial vehicle 50. The pitch controller 173 controls the attitude of the unmanned aerial vehicle 50 in the pitch direction based on a command from the unmanned aerial vehicle controller 150 and the detection result of the pitch gyro 172.

When the unmanned aerial vehicle 50 is a helicopter having of 4 main rotors, the roll controller 171 carries out the rotation frequency control and pitch control of the main rotors on the left side and/or right side with respect to a longitudinal line of the unmanned aerial vehicle 50. Also, the pitch controller 173 carries out the rotation frequency control and pitch control of the main rotors on the nose side and the tail side.

When the unmanned aerial vehicle is a helicopter having a main rotor and a tail rotor, the roll controller 171 and the pitch controller 173 carries out a cyclic pitch control of the main rotor.

When the unmanned aerial vehicle is a fixed-wing craft, the roll controller 171 controls the aileron and the pitch controller 173 controls the elevator.

The yaw gyro 174 detects an attitude change of the unmanned aerial vehicle 50 in a yaw direction. The yaw controller 175 controls the attitude of the unmanned aerial vehicle 50 in the yaw direction based on a command from the unmanned aerial vehicle controller 150 and the detection result of the yaw gyro 174.

When the unmanned aerial vehicle 50 is the helicopter having 4 main rotors, the yaw controller 175 carries out rotation frequency control and pitch control of main rotors that are on a diagonal line.

When the unmanned aerial vehicle is a helicopter having a main rotor and a tail rotor, the yaw controller 175 controls the pitch and a rotation frequency of the tail rotor.

When the unmanned aerial vehicle is a fixed-wing craft, the yaw controller 175 controls a rudder.

The rotor pitch controller 177 controls a collective pitch of the main rotor. Also, when the unmanned aerial vehicle is a fixed-wing craft, the rotor pitch controller 177 controls a propeller pitch.

The rotor rotation controller 178 controls a rotation frequency of the main rotor. Also, when the unmanned aerial vehicle is the fixed-wing craft, the rotor rotation controller 178 controls the rotation frequency of propellers. Note that as an engine when the unmanned aerial vehicle 50 flies, a turbine such as a motor and an internal combustion engine can be used. When the internal combustion engine is used as the engine, the configuration can be used that the supply of fuel through the cable 72 and the connector 40-1.

The communication section 162 receives the commands of the roll attitude, the pitch attitude, the yaw attitude, the rotor rotation frequency, the rotor pitch, the mission, the flight position, the locking or unlocking condition of the locking/unlocking mechanism 158 and so on from the armored vehicle 10. The communication section 162 transmits data such as the height, the position, the imaging data, the power supply status, the unmanned aerial vehicle status and so on to the armored vehicle 10.

The contact 70 having an extendable contact point is disposed in the engaging section 62 of the unmanned aerial vehicle loading section 14. The contact 70, the communication section 162, the power supply 156 and the locking/unlocking mechanism 158 are electrically connected through the cable 72.

Configuration Example of Signal Processing System of Armored Vehicle

Next, a configuration example of the signal processing system of the armored vehicle 10 for the unmanned aerial vehicle 50 will be described with reference to a block diagram of FIG. 4. Note that the configuration of the armored vehicle 10 is not limited to the configuration shown in FIG. 4.

Figure 4:
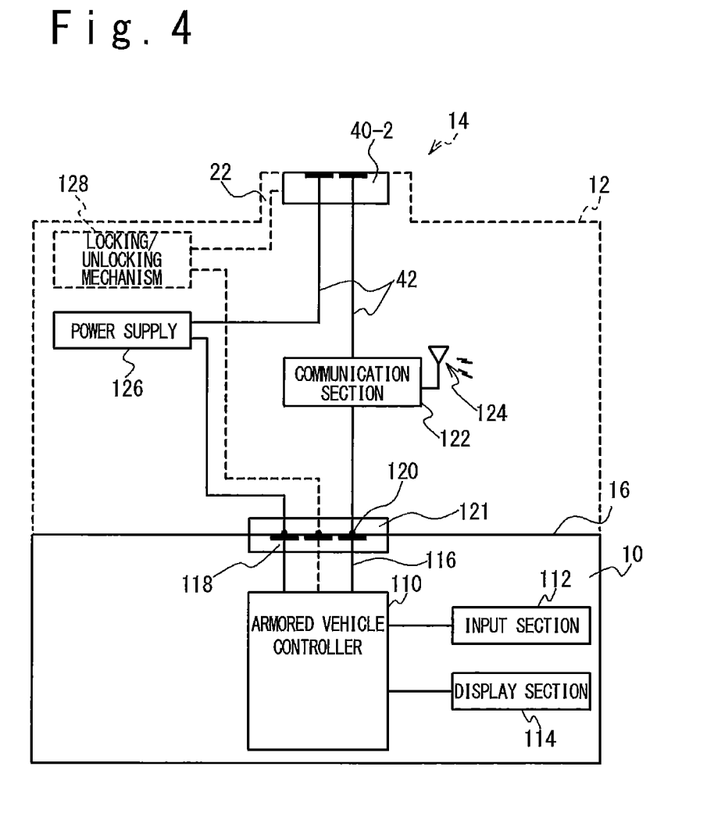
FIG. 4 is a diagram showing a configuration example of a signal processing system of the armored vehicle for the unmanned aerial vehicle.

In a configuration example shown in FIG. 4, the armored vehicle 10 includes an input section 112, a display section 114, cables 116 and contacts 118. The modularized armor structure 12 of the armored vehicle 10 includes contacts 120, an armored vehicle connector 121, a communication section 122, an antenna 124, a power supply 126, a locking/unlocking mechanism 128, the unmanned aerial vehicle loading section 14, an engaging section 22, and the connector 40-2.

The armored vehicle controllers 110 carries out the processing of a control of a locking/unlocking control when the loading and separation of the unmanned aerial vehicle 50, the transmission of control data of the flight of the unmanned aerial vehicle 50, the reception of the observation data, the management of the power supply 126, the communication control, the input of the control data from the user, the presentation of the data to the user, and the controls of the unmanned aerial vehicle 50.

The input section 112 is used to input a lock command or an unlock command in case of the loading and separation of the unmanned aerial vehicle 50, the control data of the flight of the unmanned aerial vehicle 50 (roll attitude, pitch attitude, yaw attitude, rotor pitch, rotor rotation frequency, flight position and so on), the control data for various measuring units (altimeter 151, position measuring unit 152, radar ranging unit 153, imaging unit 154 and so on), an acquisition command of the unmanned aerial vehicle status, and other data. The input unit 112 is exemplified by a keyboard, a mouse, a trackball, a joystick, a switch, a touch-panel.

The display section 114 displays data such as the position and attitude of the unmanned aerial vehicle 50, the measurement results of various measuring units, the unmanned aerial vehicle status and so on.

The cable 116 electrically connects the contact 118 and the armored vehicle controller 110. When the modularized armor structure 12 is attached, the contact 118 is set to the conductive state with the contact 120 disposed in the connector 121 of the modularized armor structure 12 to allow the supply of power and the transmission and reception of the data.

The communication section 122 communicates with the unmanned aerial vehicle 50 in wire or radio. In case of the wire communicating, the communication section 122 communicates through the connector 40-2 and the cable 42 disposed in the unmanned aerial vehicle loading section 14. In case of the radio communication, the communication is carried out through the antenna 124. Generally, the antenna 124 is disposed outside the modularized armor structure 12. Note that the communication section 122, the antenna 124, the power supply and so on may be disposed on the side of the armored vehicle 10.

The power supply 126 supplies the power to the unmanned aerial vehicle 50 to allow the power supply 156 of the unmanned aerial vehicle 50 to be charged. Note that the power supply 126 can receive the supply of the power from the armored vehicle 10. Also, when an internal combustion engine is used to make the unmanned aerial vehicle 50 fly, a configuration may be used that fuel is supplied through the connectors 40 (40-1, 40-2).

The locking/unlocking mechanism 128 carries out the loading (locking) and separation (unlocking) of the unmanned aerial vehicle 50 to and from the unmanned aerial vehicle loading section 14. Note that the locking/unlocking mechanism 128 may not be disposed on the modularized armor structure 12, but the unmanned aerial vehicle 50.

The engaging section 22 of the unmanned aerial vehicle loading section 14 is composed of the connector 40-2. The connector 40-2, the communication section 122, the power supply 126 and the locking/unlocking mechanism 128 are electrically connected through the cable 42. The cable 42 is used for the supply of the power or the communication of the control signal to the unmanned aerial vehicle 50.

Example of Electromagnetic Type Locking/Unlocking Mechanism

Figure 5:
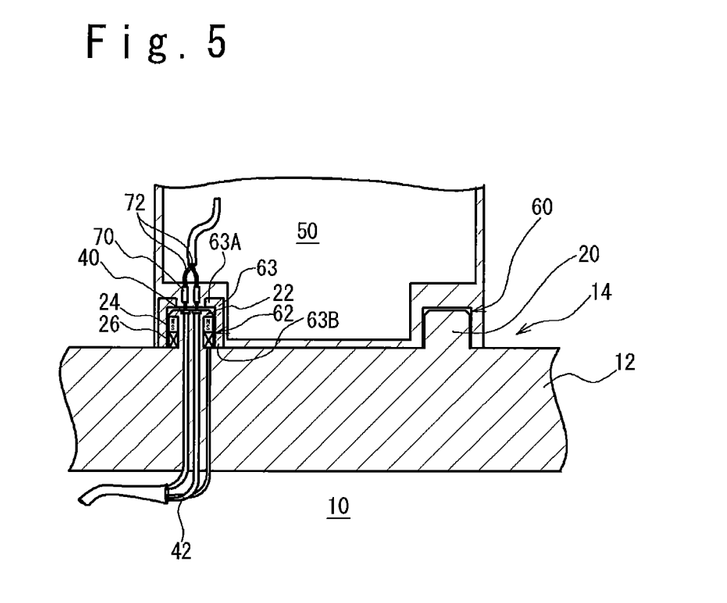
FIG. 5 is a side sectional view showing an example of an unmanned aerial vehicle loading mechanism of a modularized armor structure.

Next, an example of the unmanned aerial vehicle loading section 14 with an electromagnetic type locking/unlocking mechanism will be described with reference FIG. 5. The unmanned aerial vehicle loading section 14 of the modularized armor structure 12 is provided with a convex type engaging section 20 functioning as a rotation preventing section and a convex type engaging section 22 functioning as a locking and unlocking mechanism. An engaging section 60 and the engage section 62 are disposed in the unmanned aerial vehicle loading section 14 of the unmanned aerial vehicle 50 to engage with the engaging sections 20 and 22. Note that the components having the same functions as the components described in FIG. 2 to FIG. 4 are assigned with the same reference numerals, and the description is omitted.

A permanent magnet 24 and a release coil 26 are arranged in the outer periphery of the side wall of the engaging section 22, and the engaging section 22 is configured of magnetic substance. A magnetic substance 63 is arranged in the inner periphery of the engaging section 62. A magnetic substance suction section 63A of the unmanned aerial vehicle 50 is attracted to the top of the engaging section 22 with a magnetic field generated by the permanent magnet 24. Also, a magnetic substance suction section 63B is attracted to the surface of the modularized armor structure 12 of the side of the engaging section 22. By the attractive force of these magnetic substance suction sections 63A and 63B, the unmanned aerial vehicle 50 is loaded and fixed on the armored vehicle 10.

When the unmanned aerial vehicle 50 should be separated, a current is supplied to the release coil 26 to generate a magnetic field in an opposite direction to the direction of the magnetic field generated by the permanent magnet 24. Thus, the attractive force of the magnetic substance body suction sections 63A and 63B becomes weak so that the unmanned aerial vehicle 50 can be separated from the unmanned aerial vehicle loading section 14 of the modularized armor structure 12.

Example of Mechanical Type Locking/Unlocking Mechanism

Figure 6:
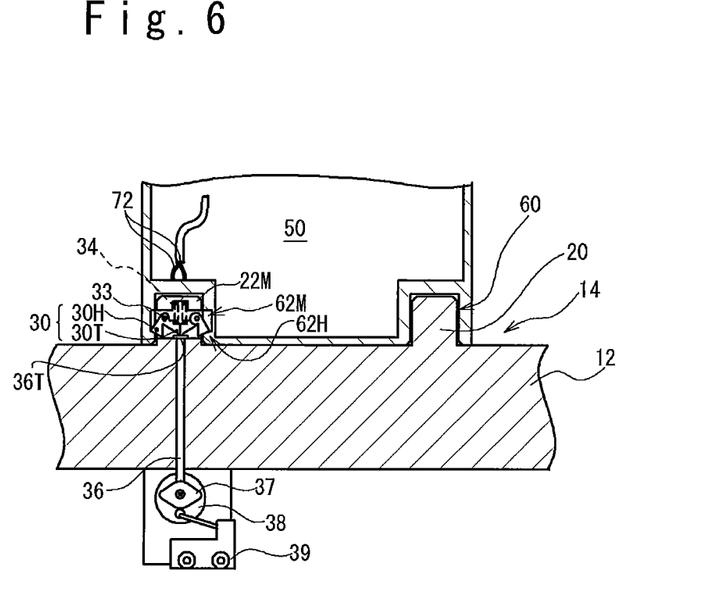
FIG. 6 is a side sectional view showing another example of the unmanned aerial vehicle loading mechanism of a modularized armor structure.
Figure 7:
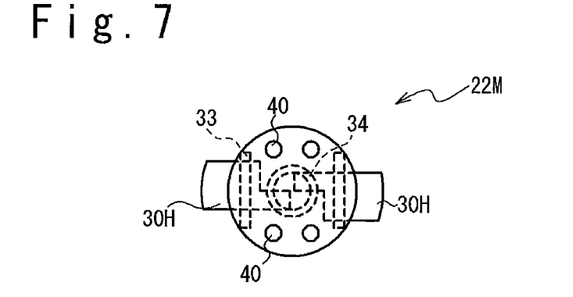
FIG. 7 is a plan view of engaging sections shown in FIG. 6.
Figure 8:
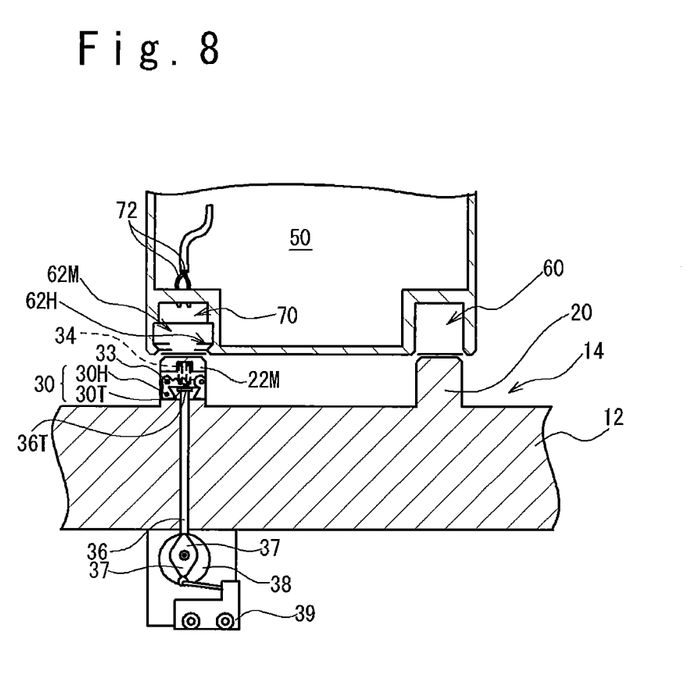
FIG. 8 is a side sectional view showing an operation condition of a locking/unlocking mechanism of the modularized armor structure to make the unmanned aerial vehicle fly.

Next, an example of the unmanned aerial vehicle loading section 14 having a mechanical type locking/unlocking mechanism will be described with reference to FIG. 6 to FIG. 8. FIG. 6 is a side sectional view showing the example of the unmanned aerial vehicle loading section 14 having the mechanical type locking/unlocking mechanism. FIG. 7 is a plan view of an engaging section 22M shown in FIG. 6. FIG. 8 is a side sectional view showing a state that the lock is cancelled in the mechanical type locking/unlocking mechanism shown in FIG. 6. Note that the components having the same functions as the components described in FIG. 2 to FIG. 5 are assigned with the same reference numerals, and the description is omitted.

Referring to FIG. 6 to FIG. 8, the unmanned aerial vehicle loading section 14 of the unmanned aerial vehicle 50 is provided with the mechanical type locking/unlocking mechanism has engaging sections 60 and 60M, the contacts 70, and the cables 72. The unmanned aerial vehicle loading section 14 on the modularized armor structure 12 is provided with the engaging sections 20 and 22M, a swing block 30, a swing axis 33, a lock spring 34, a pushrod 36, a cam 37, a geared motor 38, a limit switch 39.

The engaging section 62M of the unmanned aerial vehicle 50 is inserted into the engaging section 22M so that the engaging section 62M is positioned. A hook engaging section 62H is formed near the opening in the inner periphery of the engaging section 62M to engage with the swing block hook section 30H of the swing block 30 (see FIG. 6 and FIG. 8).

The two swing blocks 30 are disposed in the inside of the engaging section 22M of the modularized armor structure 12, to be possible to swing around the swing axis 33. The swing block 30 has the swing block hook section 30H which engages with the hook engaging section 62H disposed in the inner periphery of the engaging section 62M to engage with the hook engaging section 62H so that the unmanned aerial vehicle 50 can be maintained in the loaded state, and a swing block tappet section 30T which makes the sing block 30 swing in response to a force from the pushrod 36 in case of separation of the unmanned aerial vehicle 50.

The lock spring 34 biases the swing block hook section 30H in a direction of the pushrod tappet section 36T and maintains the swing block hook section 30H in a state that the swing block hook section 30H is stuck from the side of the engaging section 22M.

The pushrod 36 has a pushrod tappet section at the top end. As shown in FIG. 6, in the condition that the pushrod 36 descended, the swing block tappet section 30T become a descended state and the swing block hook section 30H protrudes from the side of the engaging section 22M as shown in FIG. 6 and FIG. 7. Also, in the condition that the pushrod 36 is arisen as shown in FIG. 8, the swing block tappet section 30T rises and the swing block hook section 30H is housed inside the engaging section 22M.

The geared motor 38 rotates a cam 37. For example, in the condition (the condition shown in FIG. 6) that the bottom end of the pushrod 36 contacts a base circle of the cam 37, the pushrod 36 maintains the descended state. Also, in the condition (the condition shown in FIG. 8) that the bottom end of the pushrod 36 contacts a vertex on the cam mountain of cam 37, the pushrod 36 is set in an arisen state.

The limit switch 39 detects a position of the cam mountain of the cam 37. For example, the limit switch 39 indirectly detects that in the condition shown in FIG. 6, the base circle of the cam 37 contacts the roller of the limit switch 39, and the swing block hook section 30H in the lock state in which it protrudes from the side of the engaging section 22M. By maintaining the condition that the roller of the limit switch 39 does not contact the cam mountain of the cam 37, the unmanned aerial vehicle 50 can be loaded and fixed on the unmanned aerial vehicle loading section 14 and can maintain the load state.

Also, as shown in FIG. 8, in the condition that the cam mountain of the cam 37 pushes down the roller of the limit switch 39, the unlocked condition in which the swing block hook section 30H is housed in the inside of the engaging section 22M is indirectly detected. By maintaining the condition that the roller of the limit switch 39 is pushed down, the lock state is cancelled and the unmanned aerial vehicle 50 can be separated from the unmanned aerial vehicle loading section 14.

Note that the lock spring 34 shrinks so that the swing block hook section 30H can be housed inside the engaging section 22M, if a force is applied to the swing block hook section 30H so as to push into the center of the engaging section 22M, even in the condition that the swing block hook section 30H shown in FIG. 6 and FIG. 7 protrudes from the side of the engaging section 22M. Therefore, by applying the force to the engaging section 62M of the unmanned aerial vehicle loading section 14 so as to insert in the engaging section 22M in the condition that the swing block hook section 30H protrudes from the side of the engaging section 22M, the unmanned aerial vehicle 50 can be loaded and fixed on the unmanned aerial vehicle loading section 14 and the locked condition can be maintained.

Also, because the swing block hook section 30H is engaged with the hook engaging section 62H on the slope, the unmanned aerial vehicle 50 can be separated from the unmanned aerial vehicle loading section 14 if a large force is applied to the direction that the unmanned aerial vehicle 50 can be removed from the unmanned aerial vehicle loading section 14, in the condition shown in FIG. 6.

Structural Example of Attaching Sections 13 of Modularized Armor Structure 12B

Figure 9:
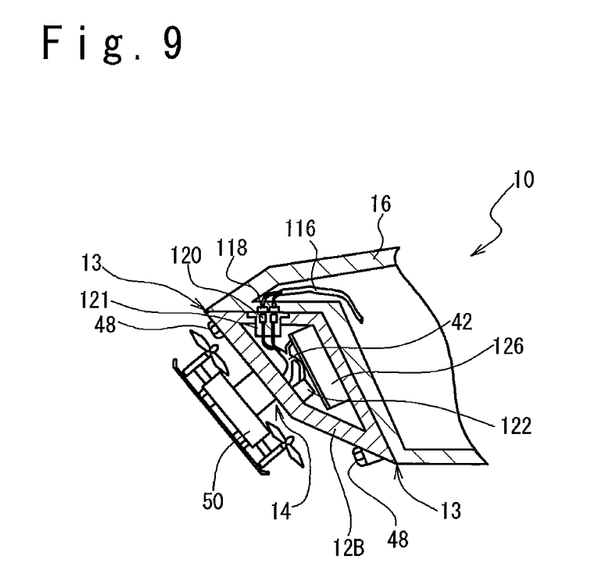
FIG. 9 is a side sectional view showing a configuration example of the modularized armor structure attached to the armored vehicle.

FIG. 9 shows a structural example of an attaching section 13 by which the modularized armor structure 12B is attached to the armored vehicle 10. The components having the same functions as the components described in FIG. 2 to FIG. 4 are assigned with the same reference numerals and the description thereof is omitted. Also, the attaching section of the modularized armor structure 12A may have the same configuration as that of the attaching section 13 of the modularized armor structure 12B shown in FIG. 9.

FIG. 9 is a side sectional view showing a condition that the modularized armor structure 12B is attached to the front underside section of a basic external armor 16 of the armored vehicle 10. The unmanned aerial vehicle 50 is loaded on the unmanned aerial vehicle loading section 14 of the modularized armor structure 12B.

As shown in FIG. 9, the modularized armor structure 12B is exchangeably attached to the basic external armor 16 of the armored vehicle 10 with bolts 48 and so on. The attaching sections 13 of the modularized armor structure 12B is provided with the connector 121 which connects the cables 116 on the side of the armored vehicle 10 and the cable 42 on the side of modularized armor structure 12B When the modularized armor structure 12B is attached to the basic external armor 16 of the armored vehicle 10, the contacts 120 of the connector 121 and the contacts 118 of the armored vehicle 10 are set to the conductive state. By disposing the connector 121 in this way, the cables 116 of the armored vehicle 10 and the cables 42 of modularized armor structure 12B can be electrically connected without connecting and disconnecting cables separately, by attaching and removing the modularized armor structure 12B only.

By disposing the unmanned aerial vehicle loading section 14 in the modularized armor structure 12A, 12B, the modularized armor structure 12A, 12B can be easily exchanged or repaired, even if the modularized armor structure 12A, 12B is damaged. Also, because generally, there is an excessive space inside the modularized armor structure, the unmanned aerial vehicle loading section 14 can be installed in the modularized armor structure 12A, 12B without degrading an originally necessary defense performance, by using the space effectively. Also, because the modularized armor structure 12A, 12B is disposed in a portion that is bombed in a high probability, the unmanned aerial vehicle 50 can increase the effect that it acts as an additional armor, when the unmanned aerial vehicle 50 is loaded.

Embodiments of Extendable Type Control Cable

Figure 10:
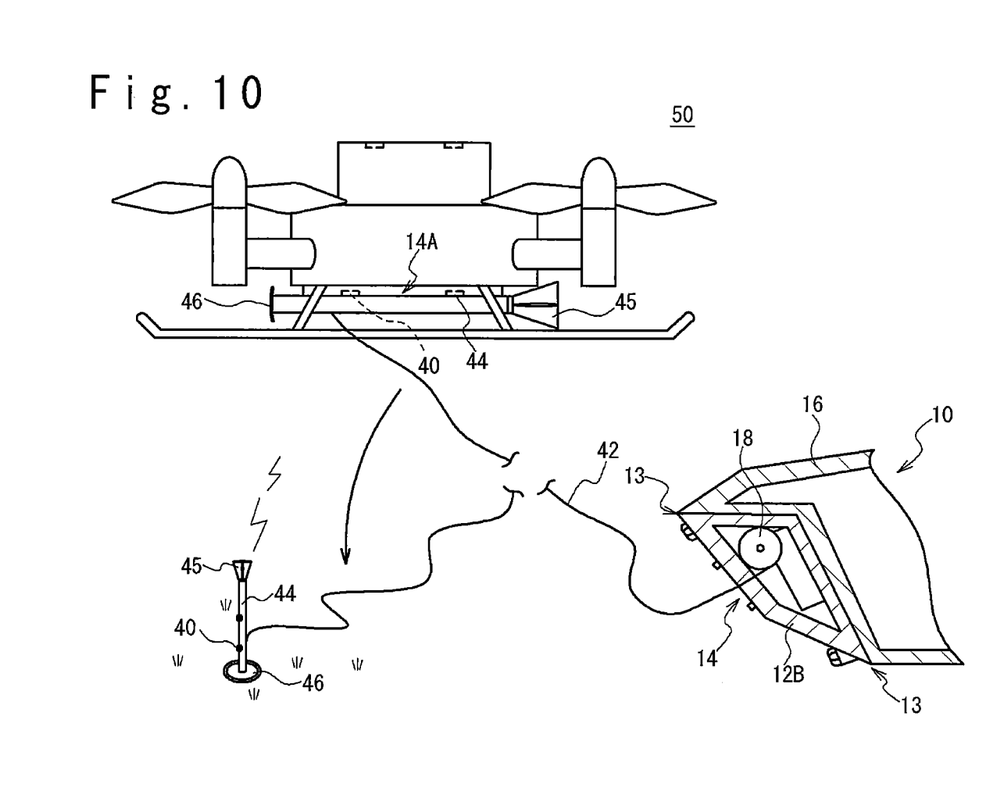
FIG. 10 is a diagram showing an example of a relation of the unmanned aerial vehicle using an extendable type control cable, the modularized armor structure, and the armored vehicle.
Figure 11:
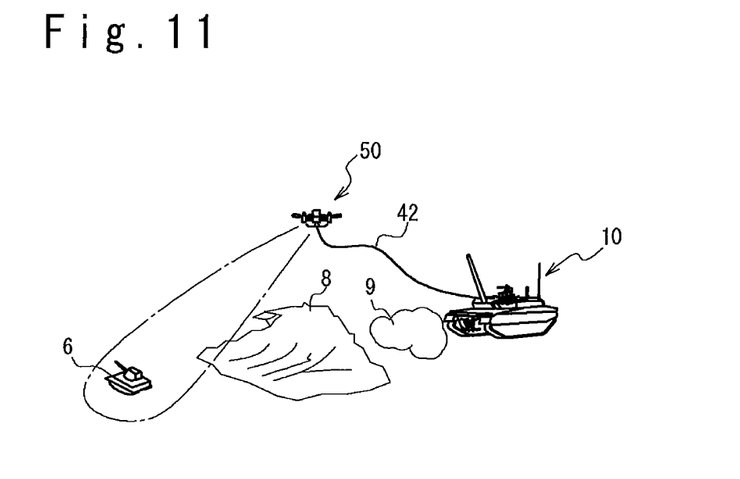
FIG. 11 is a diagram showing an example of a use operation of the unmanned aerial vehicle.

Next, referring to FIG. 10 and FIG. 11, an example of the flight and operation of the unmanned aerial vehicle 50 using an extendable type control cable 42 will be described. FIG. 10 is a diagram showing a configuration of the extendable type control cable 42, the unmanned aerial vehicle 50 and the armored vehicle 10, and the modularized armor structure 12B and a basic external armor 16 are shown by a sectional view in the armored vehicle 10. FIG. 11 is a diagram showing a state that the unmanned aerial vehicle 50 using the extendable type control cable 42 is in the flight and operation. Note that the description of portions which have the same functions as those described with reference to FIG. 1 to FIG. 4 and FIG. 9 is omitted by assigning the same reference numerals.

FIG. 10 and FIG. 11 show the states that the unmanned aerial vehicle 50 loaded in the unmanned aerial vehicle loading section 14 of the modularized armor structure 12A, 12B is separated from there, and flies while extending the control cable 42. As shown in FIG. 10, it is possible to prevent radio interception by an enemy side (attack target 6) by controlling the flight of the unmanned aerial vehicle 50 through the extendable type control cable 42, and by receiving observation data, the status data of the unmanned aerial vehicle 50 and so on from the unmanned aerial vehicle 50 through the extendable type control cable 42. Thus, by preventing the situation that a radio wave transmitted from the armored vehicle 10 is traced so that the position of the armored vehicle 10 is specified, the search of the enemy can be secretly carried out while the armored vehicle 10 hides behind the sight blocking object 8 or a smoke screen 9. Also, by carrying out a cable-communication between the armored vehicle 10 and the unmanned aerial vehicle 50 through the modularized armor structure 12, the anti-interfere ability to a deceptive radio wave can be improved.

In the embodiment shown in FIG. 10, a winding unit 18 is disposed in the modularized armor structure 12B to wind up the extendable type control cable 42. The winding unit 18 can lose the extension type control cable 42 wound in the winding unit 18 according to the flight of the unmanned aerial vehicle 50 and wind up the extendable type control cable 42. In this case, when the unmanned aerial vehicle 50 takes off, the connector 40-2 is separated from the modulated armor structure 12B and is in the connection state with the unmanned aerial vehicle 50.

Generally, the operable time of a small unmanned aerial vehicle 50 loadable on the armored vehicle 10 is a short time of a few ten minutes in a high possibility. However, a long operable time can be realized by extending the control cable 42 so that the unmanned aerial vehicle 50 can continue to fly. Thus, the continuous reconnaissance and the sight ability can be obtained. In the actual operation of the armored vehicle 10, because an approaching threat such as the target 6 can be early sensed in a condition that the armored vehicle 10 hides behind the sight blocking object, the armored vehicle 10 can remain in a long term, and the number of large scaled reconnaissance aircrafts can be decreased.

Also, by using the control cable 42 for the unmanned aerial vehicle 50 to fly, a limitation on an electric power consumption quantity can be eased in the unmanned aerial vehicle 50. Thus, an improvement of flight performance accompanied with an output increase of a thrust unit (rotor motor and so on) loaded on the unmanned aerial vehicle 50, an output increase of a mission equipment such as a radar, and improvement of the reconnaissance and sight ability by various measuring units can be attempted.

Embodiment in which Cable 42 can be Separated

Figure 12:
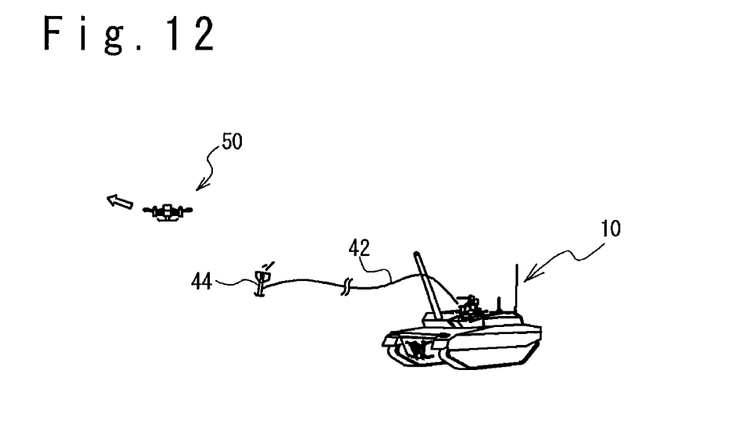
FIG. 12 is a diagram showing an example of a use operation of the unmanned aerial vehicle.

As shown in FIG. 10 and FIG. 12, a configuration that the unmanned aerial vehicle 50 and the extendable type control cable 42 are separable can be applied. FIG. 12 is a diagram showing a state that the unmanned aerial vehicle 50 flies by radio communication after the extendable type control cable 42 is separated. Note that the description of portions which have the same functions as those described with reference to FIG. 1 to FIG. 4 and FIG. 9 to FIG. 11 is omitted, by assigning the same reference numerals.

A separable connector 44 is connected with a detachable section 14A of the unmanned aerial vehicle 50. The locking/unlocking mechanism similar to the engaging section 20, 22, 22M of the modularized armor structure 12 and the engaging section 60, 62, 62M of the unmanned aerial vehicle 50, shown in FIG. 5 to FIG. 8, can be used in a coupling section between the detachable section 14A and the connector 44.

The length of the extendable type control cable 42 is finite, and a flight area of the unmanned aerial vehicle 50 is sometimes limited. Moreover, when the unmanned aerial vehicle 50 needs to fly to a distant place, it is desirable that a detachable structure is adopted for the unmanned aerial vehicle 50 and the extendable type control cable 42, as shown in FIG. 10 and FIG. 12. The connector 44 and an antenna 45 on the side of the armored vehicle are disposed at the tip section of the extendable type control cable 42. In the embodiment shown in FIG. 10 and FIG. 12, a landing section 46 is disposed at the front end of the connector 44 and the antenna 45 is disposed in the rear end.

As a method of separating the connector 44 from the detachable section 14A, an automatic separation structure can be used when a predetermined tension (tensile force of the extendable type control cable 42) is applied between the detachable section 14A and the connector 44. Also, besides, a structure can be used that cancels the lock state in response to a separation instruction from the armored vehicle 10 or the unmanned aerial vehicle 50.

The landing section 46 is a portion contacting the ground when the connector 44 lands on the ground. In the embodiment shown in FIG. 10, the embodiment in which the flat disk-like landing section 46 is disposed at the tip section. The antenna 45 is used for communication between the armored vehicle 10 and the unmanned aerial vehicle 50 after the connector 44 is separated from the unmanned aerial vehicle 50. Also, in the embodiment shown in FIG. 10, the antenna 45 of the armored vehicle 10 is formed to have an arrow structure. In case of landing the connector 44 on the ground, the connector 44 is configured so that the antenna 45 directs upwardly. Also, a folded type parachute can be arranged at the antenna 45.

As shown in FIG. 10, the antenna 45 of the armored vehicle 10 is arranged in the connector 44 which is separated from the unmanned aerial vehicle 50, and the radio communication can be carried out with the unmanned aerial vehicle 50 from a position apart from the armored vehicle 10. Thus, the reconnaissance of the enemy can be secretly carried out while preventing the enemy side from specifying the position of the armored vehicle 10.

As such, the embodiments of the modularized armor structure with the unmanned aerial vehicle loading section and the armored vehicle with the modularized armor structure according to the present invention have been described. However, the modularized armor structure with the unmanned aerial vehicle loaded and the armored vehicle with the modularized armor structure according to the present invention are not limited to the above embodiments. Various changes and modifications can be carried out to the above embodiments in a range without technical contradiction. The technical matter of one of the embodiments may be combined with the technical matters of the other embodiments.

What is claimed is:

1. A modularized armor structure comprising:
an armoring material structure formed of armoring material;

an unmanned aerial vehicle loading section configured to load an unmanned aerial vehicle outside of said armoring material structure;

an attaching section used to exchangeably attach said modularized armor structure to a predetermined basic external armor provided to an armored vehicle;

a connector electrically connected with said armored vehicle;

an antenna disposed to carry out a radio communication with a radio communication section of said unmanned aerial vehicle to allow exchange of a control signal and data between said armored vehicle and said unmanned aerial vehicle; and a winding unit configured to wind a cable connected with said connector and said antenna, wherein said antenna is separated from said modularized armor structure in a flight of said unmanned aerial vehicle.

2. The modularized armor structure according to claim 1, further comprising:

a locking/unlocking mechanism disposed in said unmanned aerial vehicle loading section to lock said unmanned aerial vehicle in response to a lock command supplied from said armored vehicle and to unlock said unmanned aerial vehicle in response to a unlock command supplied from said armored vehicle.

3. The modularized armor structure according to claim 2, wherein said locking/unlocking mechanism comprises an electromagnetic locking/unlocking mechanism.

4. The modularized armor structure according to claim 2, wherein said locking/unlocking mechanism comprises a mechanical locking/unlocking mechanism.

5. The modularized armor structure according to claim 1, wherein said armoring material structure formed of armoring material having a performance withstanding an attack using ammunitions which includes a bullet, a cannonball, a guided missile, an armor piercing ammunition, armor-piercing composite rigid, or an armor-piercing fin stabilized discarding sabot.

6. An armored vehicle comprising:

a predetermined basic external armor;

a modularized armor structure exchangeably attached to the basic external armor; and an unmanned aerial vehicle loaded on said modularized armor structure, wherein said modularized armor structure comprises:

an armoring material structure formed of armoring material;

an unmanned aerial vehicle loading section configured to load said unmanned aerial vehicle outside of said armoring material structure;

an attaching section used to exchangeably attach said modularized armor structure to said predetermined basic external armor;

a connector electrically connected with said armored vehicle;

an antenna disposed to carry out a radio communication with a radio communication section of said unmanned aerial vehicle to allow exchange of a control signal and data between said armored vehicle and said unmanned aerial vehicle; and a winding unit configured to wind a cable connected with said connector and said antenna, wherein said antenna is separated from said modularized armor structure in a flight of said unmanned aerial vehicle in a connection state with said unmanned aerial vehicle.

7. The armored vehicle according to claim 6, wherein said modularized armor structure further comprises:

a locking/unlocking mechanism disposed in said unmanned aerial vehicle loading section to lock said unmanned aerial vehicle in response to a lock command supplied from said armored vehicle and to unlock said unmanned aerial vehicle in response to a unlock command supplied from said armored vehicle.

8. The armored vehicle according to claim 7, wherein said locking/unlocking mechanism comprises an electromagnetic locking/unlocking mechanism.

9. The armored vehicle according to claim 7, wherein said locking/unlocking mechanism comprises a mechanical locking/unlocking mechanism.

10. The armored vehicle according to claim 6, wherein said armoring material structure formed of armoring material having a performance withstanding an attack using ammunitions which includes a bullet, a cannonball, a guided missile, an armor piercing ammunition, armor-piercing composite rigid, or an armor-piercing fin stabilized discarding sabot.

* * * * *